Nov. 23, 1948.　　　J. V. AUSKELIS ET AL　　　2,454,368
CLOTHES HANGER FOR VEHICLES
Filed Oct. 4, 1947
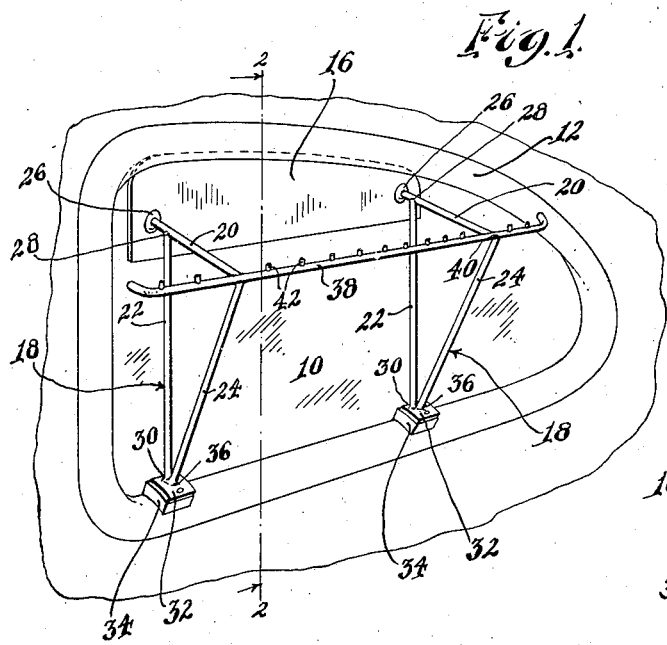
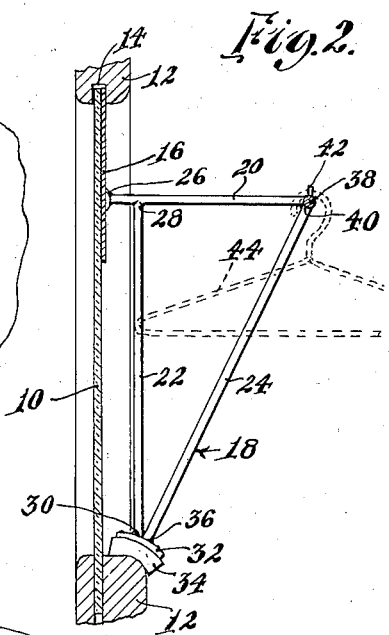
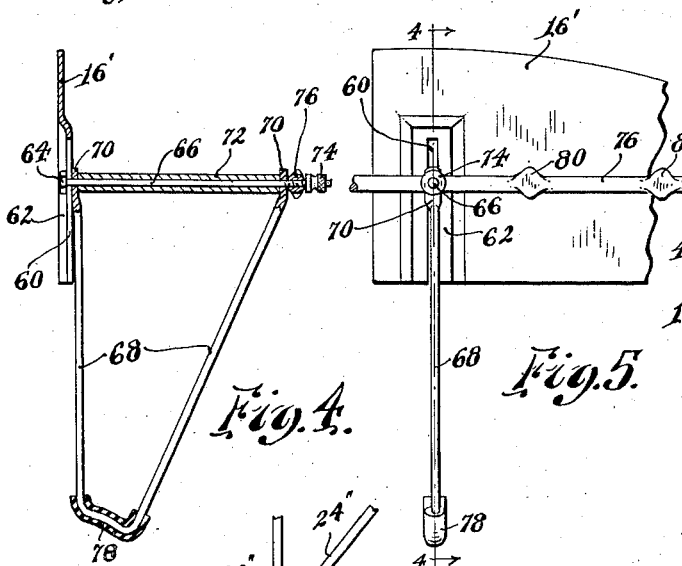
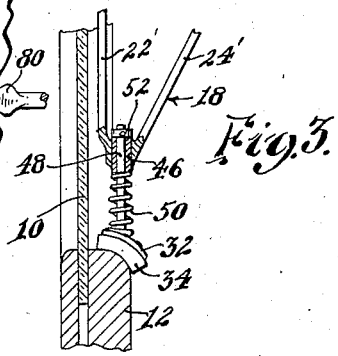
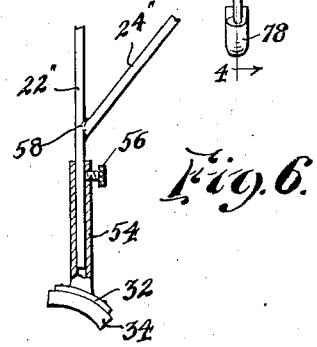
INVENTORS
John V. Auskelis
Joseph A. Martino
BY
their Atty.
John A. McKenna Patented Nov. 23, 1948

2,454,368

UNITED STATES PATENT OFFICE 2,454,368

CLOTHES HANGER FOR VEHICLES

John V. Auskelis, Dorchester, and Joseph H. Martino, Mattapan, Mass.

Application October 4, 1947, Serial No. 777,922

6 Claims. (Cl. 224—29)

This invention relates to improvements in clothes hangers for vehicles and the like. More particularly, it provides a hanger device which readily and quickly may be removably associated with a window frame of a vehicle to provide a convenient and effective means interiorly of the vehicle on which multiple articles of clothing may be hung directly or through the medium of conventional hook type clothes hangers, which latter may be distributed along the hanger device with the garments thereon suspended at a side region where they provide a minimum of interference with the comfort of passengers in the vehicle.

The wide-spread use of automobiles and planes for travel, and especially for group and family vacation trips, which require the taking along of a considerable number of suits and/or dresses and other items of outer apparel, provides a problem as to how to transport such items in the limited space available in the vehicles without undue wrinkling of the clothing. The prior vehicle hanger devices of which we have knowledge have proven inadequate for their intended purpose in that articles of clothing thereon frequently reach down to the floor and become soiled and wrinkled, and any substantial number of garments thereon either occupy the space which otherwise would be available for a passenger, or hang in positions to annoy one or more of the passengers.

It is an object of our present invention to provide a hanger device for vehicles which is adapted to support a multiplicity of conventional hook type clothes hangers which may be selectively distributed along a substantially rigid bar adjacent to one side wall of the vehicle and relatively high up in the vehicle, there being distributed abutments along the bar limiting sliding displacements of the hangers along the bar, and also for maintaining the hangers at a comfortable distance forward of a passenger who may be sitting behind the suspended garments on the hanger device, or the hangers and garments thereon may be distributed as far back as the rear seat of the vehicle when the position on that seat behind the garments is to be left vacant.

Another object, is to provide a relatively long hanger bar for holding multiple conventional clothes hangers, and means for removably mounting the bar in horizontal fore-and-aft position within, and adjacent to a side window of, a vehicle.

A further object is to provide a clothes hanger suspension bar having associated means for removably supporting the bar from the frame of a side window of the vehicle, with means distributed at intervals along the bar for restraining sliding movements of the hangers along the bar.

Yet another object is to provide a horizontal hanger bar for vehicles having means for removably mounting it on the frame of a side window of a vehicle, with provision for adjustment of the mounting means to operatively coact with varying shapes and sizes of window frames.

It is moreover, our purpose and object generally to improve the structure and operative efficiency and effectiveness of hanger devices for vehicles, especially for automobiles and the like.

In the accompanying drawing:

Fig 1 is a perspective of a portion of the interior of a vehicle having mounted on the window frame thereof a hanger-device embodying features of our invention;

Fig. 2 is a cross-sectional view approximately on line 2—2 of Fig. 1, on a larger scale, and showing, by dotted lines, a conventional clothes hanger suspended therefrom;

Fig. 3 is a fragmentary cross-sectional view generally similar to Fig. 2 but showing only the lower portion of a modified form of hanger device whose supporting legs are adjustable to fit various sizes of window frames;

Fig. 4 is a cross-sectional view of another modified form of hanger device, the section being on line 4—4 of Fig. 5;

Fig. 5 is a front elevation of one end portion of the hanger device of Fig. 4; and Fig. 6 illustrates still another modification wherein the supporting legs of the hanger device are adjustable by reason of telescoping leg portions.

Referring to the drawing, the window 10 is representative of vehicle windows at either side of a vehicle body, and the frame thereof indicated at 12. The upper portion of the usual glass-run-channel is represented at 14 in Fig. 2, this channel customarily having cushioned sidewalls (not shown) for resiliently engaging the glass 10, so that the glass can resiliently yield a little under pressure from either side, and this permissible slight yielding of the glass 10 is utilized to enable insertion of the upper marginal edge of a hanger plate 16 between the glass 10 and a side wall of its channel, or in the channel alone when the window glass 10 is open or partially open.

In Figs. 1 and 2, the upper marginal edge of hanger plate 16 is illustrated in the said inserted position with the plate extending out of the channel a substantial distance in general parallelism with glass 10. The plate is formed of relatively thin, rigid stock, which may be sheet metal, plywood or a suitable plastic material, and it has substantial extent longitudinally of the window for constituting a support for a pair of similar, spaced apart brackets 18, which extend downward and rest on the lower run of the window frame 12.

In the form of the invention illustrated in Figs. 1 and 2, each bracket 18 is a triangular structure comprising the rigid rods 20, 22 and 24 of which the rod 20 of each bracket has one end rigidly secured at 26 to the plate 16 whence it extends outwardly in a generally horizontal plane, with the two rods 20 in general parallelism. Each rod 22 is disposed generally in a vertical plane, with its upper end welded or otherwise rigidly secured at 28 to a rod 20, and with its lower end welded or otherwise rigidly secured at 30 to a shoe plate 32 whose under side is faced by a relatively thick resilient pad 34 of rubber or the like. The rods 24 extend obliquely, each from the outer end of a rod 20 to a shoe-plate 32, to which shoe-plates the lower ends of rods 24 are welded or otherwise rigidly secured as at 36.

A horizontal rigid rod 38 is welded or otherwise rigidly secured at 40 to each bracket at the juncture regions of the rods 20, 24, and rod 38 preferably has the distributed lugs 42 thereon for a purpose which presently will appear.

From the foregoing description, it will be apparent that the hanger device of Figs. 1 and 2 is a rigidly inter-connected structure, the upper margin of whose plate 16 may be inserted in the upper glass-run-channel with the resilient shoe-pads 34 of each bracket 18 resting on the lower run of the window casing 12, and with gravity tending to seat the pads 34 on the window casing. Garments on conventional hangers, such as that indicated at 44 in Fig. 2, may be hooked over the horizontal rod 38 between selected ones of the lugs 42, and the lugs will limit the permissible sliding of hangers along rod 38.

While hanger devices of the Figs. 1 and 2 form readily may be designed and manufactured in sizes to fit the various shapes and sizes of windows in the different makes of vehicles, it is considered desirable to provide structures which readily may be adjusted to fit windows of varying dimensions.

As represented in Fig. 3, each of the brackets 18 may be provided with a resiliently adjustable foot-plate 32 and pad 34 by inclusion of a relatively short tubular sleeve 46 at the juncture of the vertical rod 22' and the oblique rod 24', with a stem 48 on shoe-plate 32 slidably engaged in the sleeve. A coil spring 50 on stem 48 is engaged between the foot-plate 32 and the lower end of the sleeve 46, constantly biasing the foot-plate downwardly, with a collar 52 on the upper end of stem 48 limiting the downward movement of the shoe-plate and its pad 34.

A simpler form of foot-plate adjustment is illustrated in Fig. 6, where the shoe-plate 32 has a tubular stem 54 within which telescopes the lower end portion of the vertical bracket rod 22'', with a set screw 56 for securing the shoe-plate in adjusted position. In this form, the oblique bracket rod 24'' has its lower end welded or otherwise rigidly secured at 58 to the vertical bracket rod 22'' well up from the lower end of the latter.

If desired, our improved hanger devices may be designed to have each bracket vertically adjustable as a unit relative to its supporting plate. Figs. 4 and 5 illustrate a structure whose plate 16' has a vertical slot 60 extending upward from its lower edge at the location of each bracket, only one bracket being shown in Figs. 4 and 5, it being understood that the other bracket will be similarly mounted. The plate has an outset portion 62 in which the slot 60 extends so that the head 64 of a long bolt 66 may engage the rear side of the outset portion and be entirely forward of the plane of the inner surface of the plate proper, as well as being held against rotation. Each bracket, in this form, comprises the bent rod 68 whose opposite ends are flattened at 70 and provided each with a hole through which the bolt 66 extends, with a tubular member 72 on the bolt between the ends of the bent rod 68. The bolt extends outward beyond the outer end of rod 68, and its outer end is threaded for reception of the finger-nut 74. However, a horizontal rod or bar 76 has a hole therethrough opposite each bolt, so that the rod 76 may be arranged on the outer ends of the bolts 66 before the finger nuts 74 are applied, and when the nuts are applied and screwed tight, all of the elements on each bolt are clamped together and against the outset portions 62 of plate 16' to provide a generally rigid structure. By loosening a nut 74, the bracket may be adjusted vertically up or down along slot 60 for adapting the bracket to fit any particular window frame. The lower end portion of the bent rod 68 preferably will be covered by rubber or the like, which conveniently may be a short section of rubber tubing 78. Abutments 80 on the horizontal rod 76 may be formed by a general flattening and deforming of the rod at intervals therealong, or inserted lugs may be provided along the rod similar to those on the rod 38 of the Figs. 1 and 2 form.

The invention makes it practical and convenient to carry a considerable number of garments interiorly of a vehicle without the garments becoming wrinkled or soiled by contact with the floor of the vehicle. Also, the suspended garments may be arranged in goodly number well forward on the horizontal rod 38 or 76 leaving ample room rearwardly thereof for comfortable seating of a full complement of passengers on the rear seat. Another very definite advantage is that all garments, with their conventional hangers, may be lifted together from my hanger device and be carried together into a hotel or house, without need for multiple trips and independent removal of individual garments.

We claim as our invention:

1. A hanger device mountable interiorly of a vehicle on a window frame thereof, comprising a member having an upper marginal portion adapted for insertion upwardly into the glass-run-channel at the top frame portion of a vehicle window, a pair of brackets extending outwardly and downwardly from said member in spaced general parallelism, a rigid member secured to the outwardly extending portion of each bracket and having generally straight extent between the brackets, and a foot at the lower end of each bracket adapted to rest on the lower horizontal run of the window frame and urged by gravity downwardly and inwardly against said horizontal run of the window frame, said brackets being adapted to support said rigid member on the window frame in a generally horizontal plane, and said rigid member being adapted for holding articles in suspended relation thereto.

2. A hanger device mountable interiorly of a vehicle on a window frame thereof, comprising a rigid plate having a relatively thin upper marginal edge adapted to be inserted upwardly into the glass-run-channel at the top frame portion of a vehicle window, a rigid hanger rod, means extending rigidly outward from said plate at a plurality of spaced locations therealong supporting said hanger rod a substantial distance away from the plate, and other means extending rigidly downward and inward from said hanger rod at a plurality of spaced locations therealong and adapted to rest by gravity on the lower run of the window frame thereby to support said hanger rod in a generally horizontal plane.

3. A hanger device for vehicles and the like, comprising a hanger rod, supporting means for said rod including a generally horizontal member rigidly connected at one end to the rod and having means at its other end insertible into the glass-run-channel of a vehicle window frame whereby the rod is spaced by said member a predetermined distance from the plane of said glass run channel, and also including a plurality of members rigidly connected to the rod at spaced locations therealong and extending downwardly and adapted to rest by gravity on the lower run of the window frame, thereby to maintain said inserted member engaged in said channel and to support said hanger rod in a generally horizontal plane.

4. A hanger device for vehicles and the like, comprising a rigid member adapted to be arranged generally longitudinally of a vehicle window and having portions, at a plurality of locations therealong, adapted for insertion upwardly into the glass-run-channel of the window, means rigid with said rigid member extending outwardly therefrom at spaced locations therealong, a hanger rod secured to the outer portions of the latter said means and having generally straight extent therebetween, and a plurality of legs adapted to rest by gravity on the lower run of the window frame and to support said hanger rod in a generally horizontal plane and to maintain said inserted portions of the rigid member against escape from said channel.

5. A hanger device for vehicles and the like, comprising a rigid plate having an upper marginal portion adapted for insertion upwardly into the glass-run-channel at the top frame portion of a vehicle window, a pair of legs rigidly secured to said plate at spaced locations therealong and extending downwardly therefrom in general parallelism, a foot on the lower end of each said leg for resting on the lower run of the window frame, a hanger rod, means extending between said rod and said plate and between said rod and the lower portion of each of said legs for supporting said rod rigidly in a generally horizontal plane outwardly of said plate, and means for adjusting the distance from said inserted margin of the plate to the frame-engaging surface of a said foot.

6. A hanger device for vehicles and the like, comprising a rigid hanger bar, supporting means for mounting said bar in a generally horizontal plane interiorly of a vehicle in spaced relation to a window of the vehicle, said supporting means including a bracket member having a rigid arm extending from the bar toward an upper region of said window and a rigid leg extending from the bar obliquely downwardly and inwardly with its lower end portion adapted to rest on the lower horizontal portion of the frame of said window, and means at the end of said rigid arm adapted for relatively broad engagement in the glass-run channel of the upper frame portion of said window.

JOHN V. AUSKELIS.
JOSEPH H. MARTINO.

REFERENCES CITED

The following references are of record in the file of this patent:

UNITED STATES PATENTS

| Number | Name | Date |
|---|---|---|
| 1,201,595 | Kraemer | Oct. 17, 1916 |
| 1,956,340 | Bernhardt | Apr. 24, 1934 |
| 2,405,701 | Lange | Aug. 13, 1946 |